United States Patent [19]

Carlsson

[11] Patent Number: 5,004,022
[45] Date of Patent: Apr. 2, 1991

[54] METHOD AND AN ARRANGEMENT FOR FILLING LARGE SACKS

[76] Inventor: Börje Carlsson, Hjälmarsvik, PL 7178, S-732 00 Arboga, Sweden

[21] Appl. No.: 435,409
[22] PCT Filed: Apr. 8, 1988
[86] PCT No.: PCT/SE88/00175
§ 371 Date: Sep. 29, 1989
§ 102(e) Date: Sep. 29, 1989
[87] PCT Pub. No.: WO88/07965
PCT Pub. Date: Oct. 20, 1988

[30] Foreign Application Priority Data

Apr. 14, 1987 [SE] Sweden ................................ 8701568

[51] Int. Cl.⁵ ........................... B66F 9/00; B65B 3/16
[52] U.S. Cl. .................................... 141/114; 414/726; 414/920; 414/724; 37/118 R; 37/DIG. 12; 141/98; 141/10; 141/108
[58] Field of Search ..................... 141/1, 10, 108, 114, 141/109, 331, 344, 98, 392, 335, 340, 343; 414/912, 920, 722, 724, 725, 726, 704; 37/117.5, 118 R, 103, DIG. 12

[56] References Cited

U.S. PATENT DOCUMENTS

| | | | |
|---|---|---|---|
| 2,382,346 | 8/1945 | Streater | 414/726 |
| 3,208,109 | 9/1965 | Logus | 414/726 |
| 3,335,769 | 8/1967 | Ilg | 141/340 |
| 3,598,266 | 8/1971 | Fisher | 414/726 |
| 4,055,255 | 10/1977 | Vasquez | 414/725 |
| 4,068,771 | 1/1978 | Zimmerman | 414/722 |
| 4,300,600 | 11/1981 | Tetenborg et al. | 141/114 |
| 4,782,606 | 11/1988 | Surface | 37/117.5 |
| 4,864,748 | 9/1989 | Boyer | 37/117.5 |

Primary Examiner—Henry J. Recla
Assistant Examiner—Keith Kupferschmid
Attorney, Agent, or Firm—Sughrue, Mion, Zinn, Macpeak and Seas

[57] ABSTRACT

An arrangement for loading manageable material into containers or moulds with the aid of a mechanical shovel, and in particular to filling large sacks (10) intended for transporting or storing the matrial. The arrangement includes a mechanical shovel or scoop (5) which can be attached to a shovel loader in a conventional manner and which has an open side through which the shovel can be filled with material. The shovel defining wall located opposite the open side of the shovel when the open side thereof faces upwards is at least partially funnel-shaped (8). The passageway (9) through the funnel-shaped part is provided with a closure throttle (12) and the funnel-shaped part (8) is intended to co-act with the filling opening of the container (10) in a manner to enable a desired quantity of material to be transfered from the shovel to the container.

5 Claims, 3 Drawing Sheets

METHOD AND AN ARRANGEMENT FOR FILLING LARGE SACKS

The present invention relates to an arrangement for loading manageable material into containers or moulds with the aid of a mechanical shovel or scoop, and particularly, although not exclusively, into so-called large sacks intended for the transportation or storage of the material, the arrangement comprising a mechanical shovel which can be attached to a shovel loader in a conventional manner and which has one open side through which the shovel can be filled.

The use of so-called large sacks for transporting and storing various kinds of granular and lump materials, such as agricultural produce, coal and the like, is becoming more and more general. It is also conceivable to use so-called large sacks to transport and to store, e.g., gravel-like materials, potting composts, topsoil, etc. The filling of such sacks, however, is relatively troublesome and time-consuming when applying present day techniques. For example, when large sacks are used to distribute coal to the consumer, the coal, which is normally stacked in high mounds, must first be packed into the sacks by the supplier. This may involve the use of a conveyor belt onto which the coal can be shovelled and carried to a conical-bottom loading hopper for filling the sacks. Subsequent to being filled, it is necessary to transport the sacks, e.g. by truck, to a storage site. The aforedescribed procedure thus comprises a number of separate working stages and requires the mutual cooperation of several people, i.e. to load the coal onto the conveyor belt, to monitor the function of the belt, to attach the sacks to the bottom of the hopper, superintended filling of the sacks, and to transport the filled sacks to their destination.

The dust generated when filling the sacks is also liable to create a harmful environment in the near vicinity of the sacks. Furthermore, if the sacks are not filled satisfactorily or to capacity, the at least partially filled sacks are normally too heavy to be lifted manually to the ground and the contents thereof shaken-up so as to compact in the sack.

The main object of the present invention is to provide an arrangement which, among other things, eliminates the aforesaid drawbacks and which, inter alia, enables large sacks to be filled in a highly rational and efficient fashion by means of a single workman, without requiring risky or harmful procedures to be carried out.

The invention is thus based on a desire to eliminate the loading procedure which entails first transferring coal onto a conveyor belt with the aid of a mechanical shovel or like device, and transporting the coal to a feed hopper or corresponding apparatus, from which the sacks are then filled. This stage in conventional filling procedures has been eliminated in accordance with the present invention, by transferring the coal, or corresponding material from the mechanical shovel directly into the sack.

In addition to being employed to fill large sacks and like containers, the invention may also be applied in other contexts when dealing with loose or pourable materials, e.g. when filling containers or moulds, such as concrete forms and, for instance, when casting concrete footings and concrete plinths, grouting in fence posts, and like work in which it is necessary to transport material between different locations and sites but where only a relatively small amount of material is utilized at each such location. The inventive arrangement may, of course, also be used to portion out material in circumstances other than those mentioned.

In accordance with the invention, an arrangement of the kind defined in the introduction is mainly characterized in that the shovel-defining wall which is located opposite the open side of the shovel and which when this open side faces upwards forms the bottom of the shovel is at least partially funnel-shaped; in that the passageway through this funnel-shaped part is provided with closure means; and in that said funnel-shaped part is configured to co-act with the filling opening of the container to be filled such as to enable a desired quantity of material to be transferred from the shovel to the container. The term funnel-shaped as used here and in the following shall be given a wide interpretation and shall be understood to include all shovel-bottom configurations, shovel inserts or shovel auxiliaries which are operative in facilitating transportation of the material to the shovel outlet opening.

The closure means preferably comprises a throttle valve arranged in the passageway and having the form of an arcuately curved plate which moves in an arcuate slot in the passageway defining wall.

The throttle valve is preferably remotely controlled from the driving seat or cabin of the shovel loader, suitably with the aid of hydraulic devices, so as to facilitate dispersement of desired quantities of material.

In accordance with one preferred embodiment of the invention, intended for filling so-called large sacks, the arrangement includes a means which enables a sack to be attached to the shovel, with the funnel-shaped part, or an extension thereto, projecting into the mouth of the sack.

The sack attachment means preferably has the form of a sack-suspension device by means of which a filled large-sack can be lifted or held suspended and transported whilst hanging from the shovel.

The arrangement enables the driver of the shovel loader to fill the shovel, or scoop, with the intended material, and then lift and tilt-up the shovel and hang a sack around the discharge orifice of the funnel, whereafter the sack can be filled to the extent desired by remote control of the throttle. In order to fill the sack satisfactorily, or to capacity, the sack, when the need arises, can be lifted up and dropped down onto the ground so as to shake down and compact the material in the sack. When the sack has been filled to satisfaction, the sack can be transferred by the loader direct to the intended storage site, with the sack hanging from the shovel. Alternatively, the sacks can be filled on the storage site.

The invention will now be described in more detail with reference to the accompanying drawings, in which FIG. 1 illustrates a shovel loader equipped with a shovel or scoop that has been modified in accordance with the invention;

Figure 1:
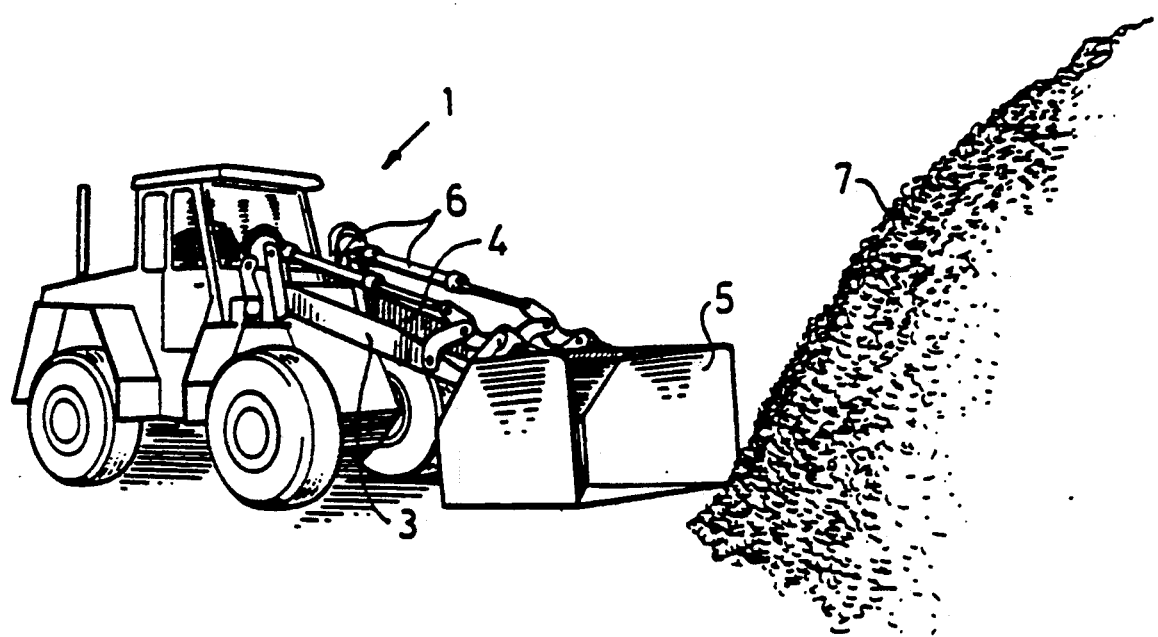

FIG. 1 illustrates a conventional front shovel loader 1 equipped with a mechanical shovel 5 which is carried by two arms 3 and 4 by means of which the shovel can be raised and lowered, and with two piston-cylinder devices 6 for tilting the shovel 5. The mechanical shovel has an open side, which in the illustrated position of the shovel faces forward so that the shovel is able to pick up material, e.g. coal, from a mound 7.

Figure 2:
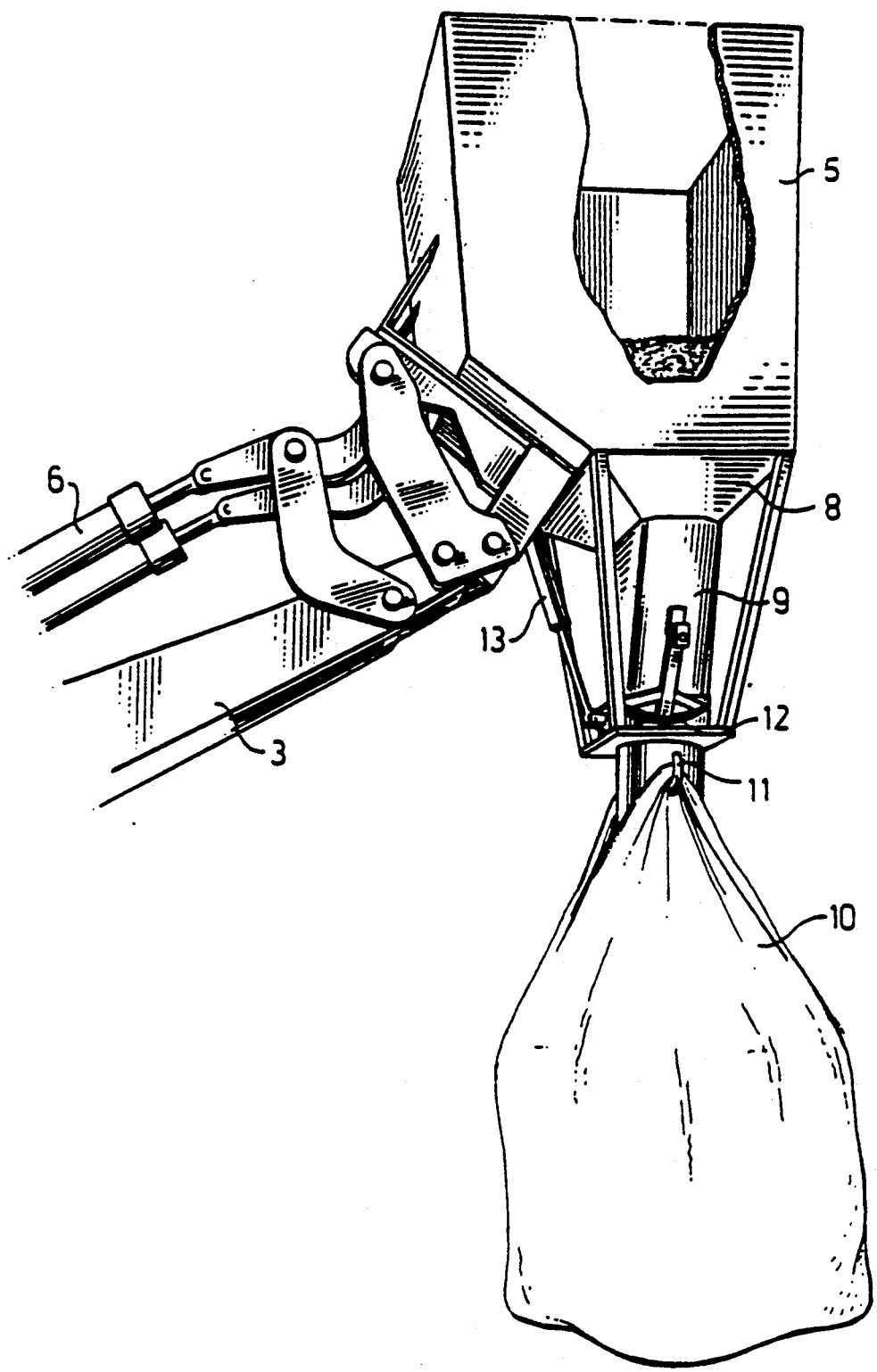
FIG. 2 illustrates the use of the shovel when filling a large sack.

Subsequent to filling the shovel with coal, the shovel is tilted with the aid of the piston-cylinder devices and is raised by the arms 3 and 4 to the position shown in FIG. 2.

FIG. 2 also shows the inventive modification to the shovel, in which the rear defining wall of the shovel, or scoop, i.e. the wall which forms the bottom of the shovel when the shovel faces upwards, is at least partly configured in the form of a funnel 8 with an associated outfeed pipe 9. This enables the driver of the loader, or an assistant, to hang a sack 10 around the discharge orifice of the outfeed pipe 9. The pipe 9 is provided to this end with hooked members 11 or the like on which the sack 10 can be hung.

In the case of the illustrated embodiment the outfeed pipe 9 incorporates a plate-like arcuately curved throttle 12 which moves in a corresponding slot in the pipe wall. The throttle 12, or corresponding valve means, can be controlled from the driving seat of the loader with the aid of a hydraulic piston-cylinder device 13. In the FIG. 2 illustration the throttle 12 has been closed subsequent to filling the sack 10 with the desired amount of material from the shovel 5.

Figure 3:
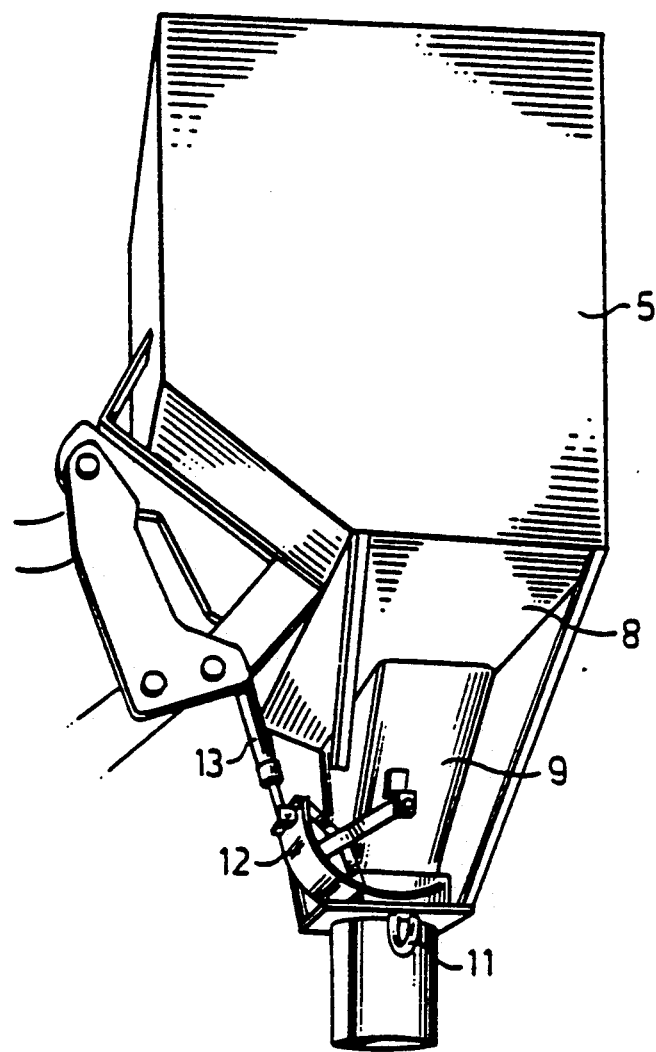
FIG. 3 illustrates the shovel with the throttle valve open.

FIG. 3 illustrates the shovel 5 with the throttle 12 in its sack-filling open position. The illustrated configuration of the throttle enables the throttle to be opened readily and reclosed with the application of a relatively small force when the shovel 5 has been partially filled with material.

The illustrated arrangement will therefore enable the large sack 10 to be filled with a desired quantity of material directly from the mound 7, or alternativley the material can be transported in the shovel 5 to a storage location for filled sacks 10, or to some other suitable location where sacks can be filled.

The sacks can be filled very easily, by controlling the throttle 12 from the driving seat or cabin of the loader. When it is necessary to shake down the material in the sack 10, in order to utilize the sack to its full capacity, the lifting arms 3 can be readily raised and lowered such as to shake down the material in the sack, and to allow the sack to fall against the ground with a given force so as to compact the material still further. Subsequent to filling the sack 10 with the desired quantity of material, the sack can be transported readily to the storage location for filled sacks and there placed in the desired position. The sack can be released from the shovel 5, by lowering the shovel and swinging the same from side-to-side, thereby obviating the need of manual assistance to remove the sack.

The described filling procedure is highly effective, since one and the same auxiliary device can be used for both shovelling-up material, e.g. from a mound of material, transferring the material to a so-called large sack and optionally compacting the material in the sack, and transporting the filled sack to a desired location and placing the sack in a given position therein. This procedure is thus effected completely without needing to lift heavy loads manually and without requiring the presence of personnel or workmen in the vicinity of the dust laden air around the sacks. Furthermore, no special-duty vehicles are required to transport the filled sacks between a filling station and a storage location.

In addition to filling large sacks, the inventive arrangement can also be used in many other connections where it is desired to dispense material capable of being handled with the aid of a mechanical shovel or scoop. As before-mentioned, such areas of use may include the casting of concrete in small moulds, particularly such moulds as those which are located at a given distance apart, in which case the invention affords the additional advantage of enabling concrete to be transported readily between the various moulds.

When necessary the aforedescribed and illustrated embodiment of the shovel can be modified in several respects within the scope of the invention, such as to adapt the shovel to the specific use intended. As an alternative to the illustrated embodiment of a funnel-shaped bottom and an outfeed pipe connected thereto, the entire shovel may be given a shape which tapers down towards a small outfeed orifice. The outfeed pipe of the illustrated embodiment may be shortened or omitted totally. In this case, the throttle 12 or corresponding closure valve, such as a pivotal flap, may be arranged directly in the funnel. As will be understood, the sack suspension means or corresponding means may be given any suitable form. In addition to a funnel-shaped bottom surface, the shovel may be provided with other active or passive elements by means of which the material is advanced towards a small outfeed orifice.

I claim:

1. A method for filling 1 with the aid of a mechanical shovel 1 large sacks with manageable material for the purpose of transporting or storing said material, characterized by using a movable shovel loader equipped with a driving seat and a tiltable shovel which can be raised and lowered with the aid of lifting arms; by filling the shovel with said material with the aid of the shovel loader, and tilting up the shovel; by placing a sack around an openable and closeable opening in rear defining wall of the shovel, which wall forms the bottom of the shovel when the shovel is tilted upwards; by opening said opening so as to transfer a desired quantity of said material from the shovel to the sack; and by transporting the sack to a desired location with the aid of the loader and with the sack hanging from the shovel.

2. An arrangement for filling large sacks (10) with manageable material with the aid of a mechanical shovel, for the purpose of transporting or storing said material, comprising a movable shovel loader (1) equipped with driving seat a tiltable mechanical shovel (5) which can be raised and lowered with the aid of lifting arms and which has an open side through which the shovel can scoop up material, characterized in that a shovel defining wall which is located opposite said open side and which forms the bottom of the shovel when said open side faces upwards, is at least partially funnel-shaped (8); the funnel-shaped part includes a passageway through which said material can flow from said shovel through said passageway (9) is provided with a closure means (12); in that the arrangement further comprises means (11) for attaching a sack (10) to the shovel (5) so that said passageway (9) connected thereto projects into the mouth of the sack (10); and in that said sack attachment means have the form of suspension means (11) which enable a filled sack (10) to be lifted and transported whilst hanging from the shovel.

3. An arrangement according to claim 2, characterized in that the closure means is a throttle (12) arranged in said passageway.

4. An arrangement according to claim 3, characterized in that said throttle has the form of an arcuately curved plate (12) which moves in an arcuate slot in said passageway (9).

5. An arrangement according to any one of claims 2, 3, or 4 characterized in that the closure means (12) is remotely controlled from the driving seat of the shovel loader (1), by means of a hydraulic device (13).

* * * * *